Oct. 11, 1949.  E. C. HARTMAN  2,484,622
FLOW DIVERSION VALVE
Filed Nov. 1, 1945.

INVENTOR.
E. C. HARTMAN
BY D. Clyde Jones
ATTORNEY

Patented Oct. 11, 1949

2,484,622

UNITED STATES PATENT OFFICE 2,484,622

FLOW DIVERSION VALVE

Elmer C. Hartman, Rochester, N. Y., assignor to Taylor Instrument Companies, Rochester, N. Y., a corporation of New York Application November 1, 1945, Serial No. 625,976

4 Claims. (Cl. 277—42)

This invention relates to flow diversion valves and the like.

The present invention has for its purpose a novel flow diversion valve provided with a simple and reliable leak detector arrangement.

Figure 1:
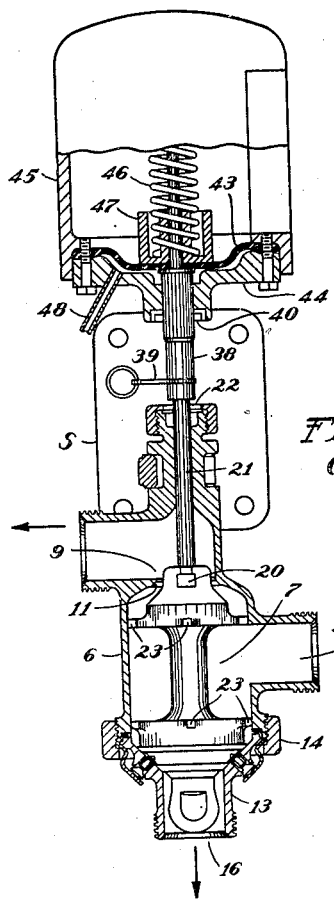
Figure 4:
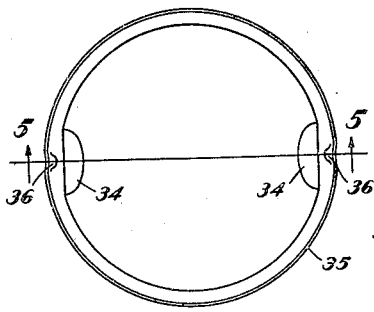
Figure 5:
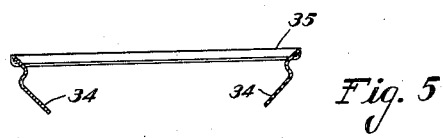
Figure 2:
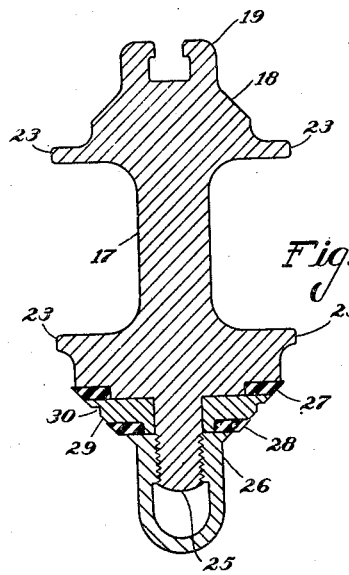
Figure 3:
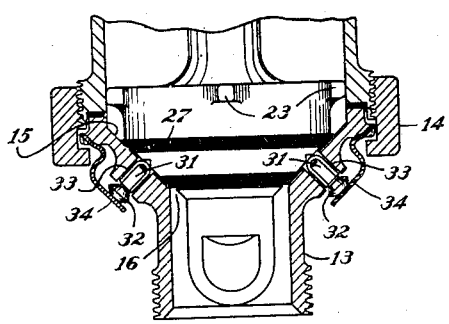

The various features of the invention will appear from the detailed description and claims when taken with the drawing in which Fig. 1 represents a partial vertical section through a flow diversion valve and its motor, constructed in accordance with the present invention; Fig. 2 is an enlarged vertical section through the movable valve element or plug; Fig. 3 is an enlarged fragmentary view of a portion of the valve body with a portion of the valve plug therein, together with the body connection, specifically illustrating the leak detector elements and the annular support therefor; Fig. 4 is a plan view of the leak detector ring with its resilient fingers; and Fig. 5 is a sectional view of this ring taken substantially on the line 5—5 of Fig. 4.

The flow diversion valve of this invention, comprises a body 6 detachably mounted on a suitable supporting plate S. The body 6 comprises a valve chamber 7 communicating with the inlet port 8 and with a diversion outlet port 9. The upper end of the valve chamber as illustrated in Fig. 1 is dome-shaped and is provided with a valve seat 11 enclosing the diversion outlet port 9. The lower open end of the valve body is closed by a separate body connection 13 detachably secured to the body proper by means of a flanged connecting nut 14. The body connection is flared to provide a conical valve seat 15 (Fig. 3), surrounding the forward flow outlet port 16 in the bottom of the body connection, being located opposite the diversion outlet 9 and the valve seat 11 related thereto.

A valve plug 17, shown in section in Fig. 3 is movable in the chamber to open the diversion port 9 and to close the forward flow outlet port 16, as shown in Fig. 1. It will be understood that the plug is also movable to its alternate position, not indicated, in which it closes the diversion port 9 and opens the outlet port 16. The valve plug comprises a slender mid-portion terminating at the top thereof in a beveled, metal valve disc surface 18 to engage the valve seat 11 in metal-to-metal relation. The extreme top end of the plug is provided with a lug 19, notched to receive the head 20 on the valve stem 21 by which stem the plug is moved to its alternate positions. The stem passes through a suitable stuffing box 22. The plug is provided with upper and lower projections which function to guide the plug in its up and down movement in the valve body. The lower end of the plug is made with an axially projecting, integrally threaded part 25 to be engaged by a retaining nut 26. This nut serves to retain on the plug, two spaced annular discs 27 and 28 of rubber or like flexible material, having tapered or beveled edges to conform to the contour of the lower valve seat 15. The rubber discs are separated by a washer 29 which is provided with a beveled edge conforming to the taper of the rubber discs. This washer has an annular groove 30 therein in which any milk that has leaked past the disc 27, can collect. When the plug is in the position shown in Figs. 1 and 2, the portions of the washer 29 at each side of the annular groove 30 encounters the stems 31 of mushroom-shaped leak detector valve elements 32. These elements are positioned in leak detector openings 33 extending through the valve seat 11 of the body connection and the mushroom heads of the leak detector elements in one position, contact the wall of the body connection to close the leak detector openings therein. These elements are normally urged toward their closed positions by the spring fingers 34 integral with a ring support 35. However, when the plug is in its flow diversion position to open the milk diversion outlet 9 and to close the forward flow outlet 16 for pasteurized milk, the washer 29 mounted on the lower end of the plug encounters the stems 31 of the mushroom valve elements so that the leak detector openings 33, normally closed thereby, are opened. Consequently, any unpasteurized milk that leaks past the disc 27 escapes through the leak detector openings and does not reach the forward flow outlet 16 through which properly pasteurized milk is intended to pass. The ring support 35 with its spring fingers 34 is preferably supported between the body connection and the connecting nut. It will be noted that the ring 35 is provided with diametrically spaced lugs 36 to be received in recesses formed on the lower body connection. This construction prevents the ring 35 from rotating when the connecting nut is tightened or loosened.

It has been mentioned that the plug is movable up and down by means of the detachable stem 21. This stem is preferably locked to a second stem section 38 by means of a suitable key 39. The upper section 38 passes in substantially airtight relation through the air seal unit 40 at the central opening in the bottom 44 of the valve motor. This motor comprises the diaphragm 43 held in position on the bottom 44 by having its margin clamped thereto by means of the lower edge of the hood 45. This hood supports a coil spring 46 which normally forces a spring cup 47 and the diaphragm 43 to its lower position unless opposed by air pressure under the diaphragm 43. It will be understood that compressed air or like motive fluid may be supplied through the conduit 48 to the chamber between the diaphragm 43 and the bottom 44 under the control of a suitable temperature controlled device (not shown).

The flow diversion valve of the present invention is intended to be used in a pasteurizing system of the type disclosed in the patent to Fielder No. 1,859,504, May 24, 1932. The present valve is an improvement over that disclosed in the patent to Karst, No. 2,243,344, May 27, 1941, both of these valves being primarily intended for use in the mentioned pasteurizing system.

What I claim is:

1. In a device of the class described, a valve body comprising an upper part and a lower part defining a valve chamber, means including a nut in threaded engagement with one of said parts for detachably sealing said parts together, said upper part being provided with a diversion outlet surrounded by a valve seat in the top thereof and with an inlet in the side thereof, said lower part being provided with a forward flow outlet in the bottom thereof surrounded by a valve seat, said last-mentioned valve seat being provided intermediate its edges with at least one leak detecting opening therein, a plug provided with a top valve portion adapted in one position of the plug to mate with the seat at the diversion outlet and provided with a bottom valve portion adapted in the alternate position of the plug to mate with a seat at the forward flow outlet, a leak detector valve element serving in one position to close said opening and in an alternate position thereof to open it, said bottom valve portion in the position of mating with the seat at said forward flow outlet serving to move said valve elements to its open position, and a single ring-like member supported on said body by said nut and provided with a spring finger normally urging said valve element into a position to close said opening.

2. In a device of the class described, a valve body comprising a hollow upper part and a hollow lower part defining a valve chamber, threads formed on the lower end of said upper part and a flange on the upper end of said lower part, a flanged nut respectively engaging the flange on the lower part and the threads on the upper part for drawing said parts together and thereby detachably sealing said parts together, said upper part being provided with a diversion outlet surrounded by a valve seat in the top thereof and with an inlet in the side thereof, said lower part being provided with a forward flow outlet in the bottom thereof surrounded by a valve seat, said last-mentioned valve seat being provided intermediate its edges with at least one leak detecting opening therein, a plug provided with a top valve portion adapted in one position of the plug to mate with the seat at the diversion outlet and provided with a bottom valve portion adapted in the alternate position of the plug to mate with the seat at the forward flow outlet, a leak detector valve element serving in one position to close said opening and in an alternate position thereof to open it, said bottom valve portion in the position of mating with the seat at said forward flow outlet serving to move said valve element to its open position, an annular member gripped between the flanges on the lower member and on said nut, said member having a finger normally urging said valve element into a position to close said opening, and means preventing rotation of said member with respect to said lower part.

3. In a device of the class described, a valve body comprising a first part and a second part defining a valve chamber, means for detachably sealing said parts together, said first part being provided with a diversion outlet surrounded by a valve seat at one end thereof and with an inlet in the side thereof, said second part being provided with a forward flow outlet in one end thereof and surrounded by a valve seat, said last-mentioned valve seat being provided intermediate its edges with spaced leak detecting openings therein, a plug provided with a top valve portion adapted in one position of the plug to mate with the seat at one of said outlets and provided with a bottom valve portion adapted in one position of the plug to mate with the seat at the other of said outlets, a plurality of leak detector valve elements serving in one position to close said openings and in an alternate position thereof to open them, one of said valve portions in the position of mating with the seat at said forward flow outlet serving to move said valve elements to their open position, and a single ring-like member supported on said body and normally urging said valve elements into a position to close said openings.

4. In a device of the class described, a valve body comprising a first part and a second part defining a valve chamber, means including a flanged nut for detachably sealing said parts together, said first part being provided with a diversion outlet surrounded by a valve seat at one end thereof and with an inlet in the side thereof, said second part being provided with a forward flow outlet in one end thereof surrounded by a valve seat, said last-mentioned valve seat being provided intermediate its edges with spaced leak detecting openings therein, a plug provided with a top valve portion adapted in one position of the plug to mate with the seat at one of said outlets and provided with a bottom valve portion adapted in one position of the plug to mate with the seat at the other of said outlets, a plurality of leak detector valve elements serving in one position to close said openings and in an alternate position thereof to open them, one of said valve portions in the position of mating with the seat at said forward flow outlet serving to move said valve elements to their open position, and a ring supported on said valve body by said flanged nut, said ring having fingers normally urging said valve elements into a position to close said openings.

ELMER C. HARTMAN.

REFERENCES CITED

The following references are of record in the file of this patent:

UNITED STATES PATENTS

| Number | Name | Date |
| --- | --- | --- |
| 1,173,703 | Benkert | Feb. 29, 1916 |
| 2,243,344 | Karst | Apr. 22, 1939 |